March 16, 1937. V. W. KLIESRATH 2,073,873
SPRING SUSPENSION
Filed Jan. 31, 1934 2 Sheets-Sheet 1
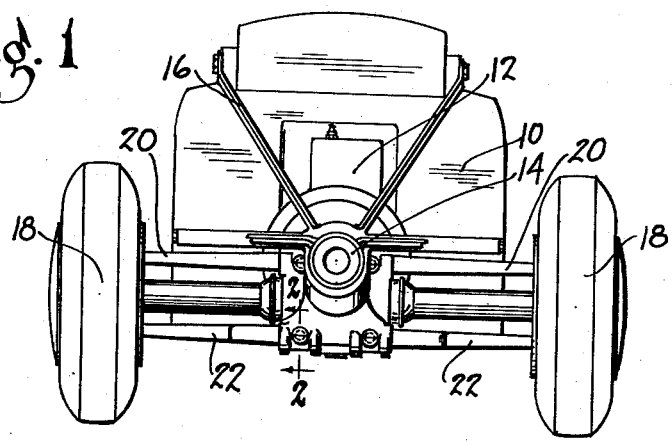
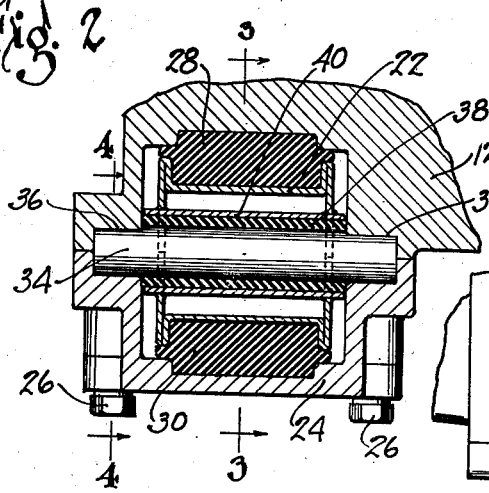
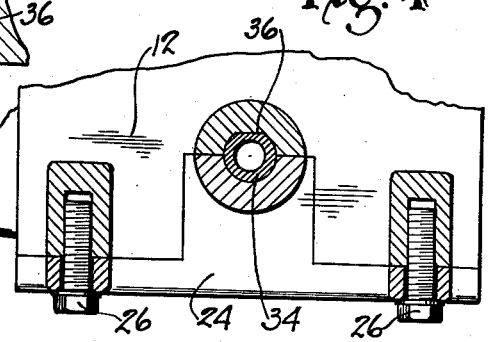
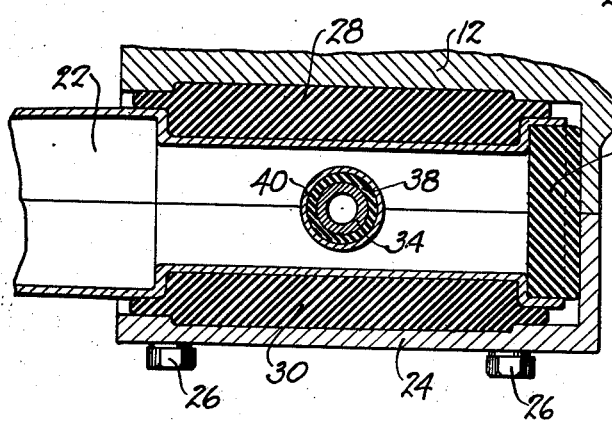
INVENTOR.
Victor W. Kliesrath
BY
ATTORNEY.

March 16, 1937.    V. W. KLIESRATH    2,073,873
SPRING SUSPENSION
Filed Jan. 31, 1934    2 Sheets-Sheet 2
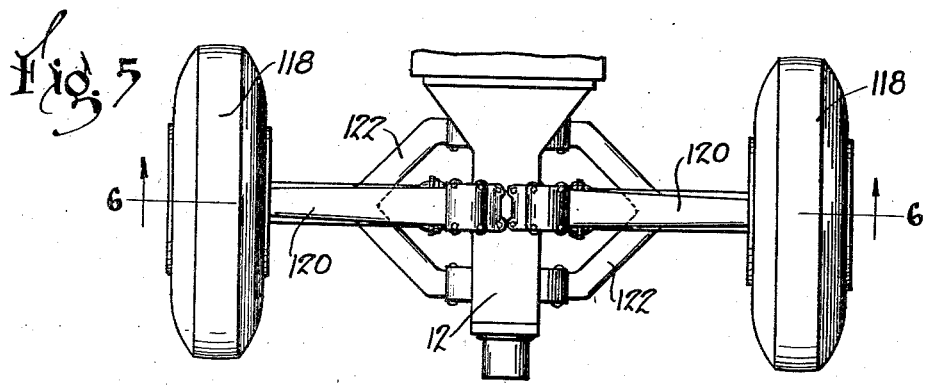
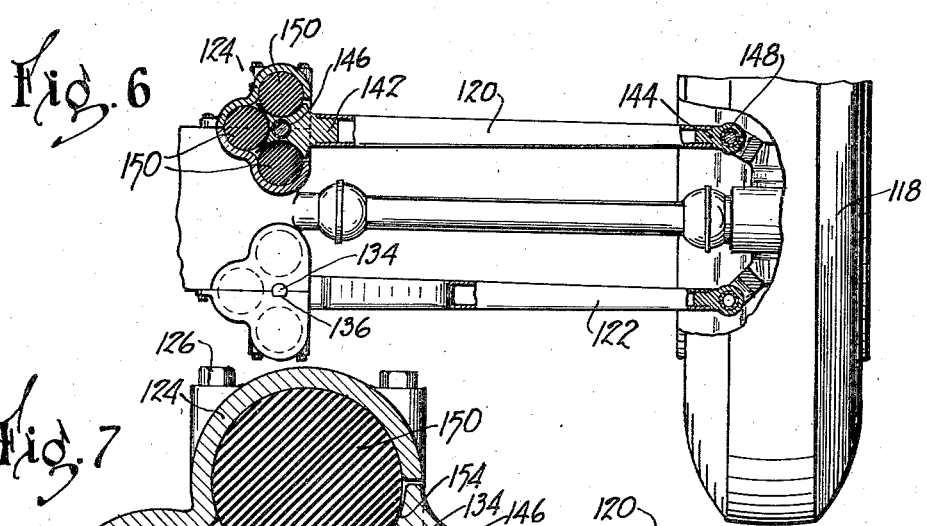
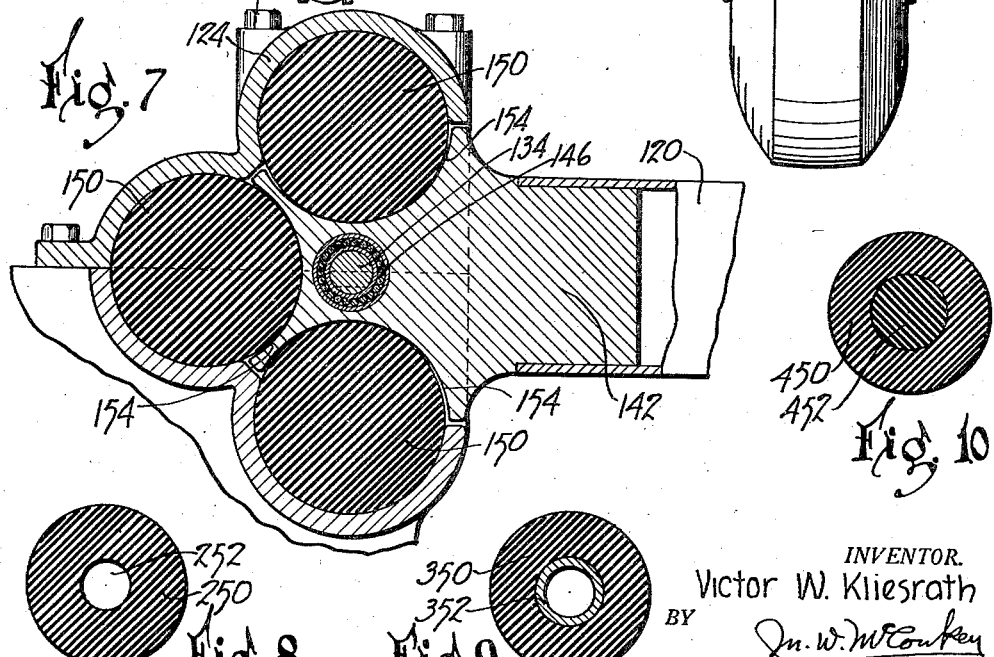
INVENTOR.
Victor W. Kliesrath
BY
ATTORNEY Patented Mar. 16, 1937

2,073,873

UNITED STATES PATENT OFFICE 2,073,873

SPRING SUSPENSION

Victor W. Kliesrath, South Bend, Ind., assignor to The Steel Wheel Corporation, Chicago, Ill., a corporation of New York Application January 31, 1934, Serial No. 709,131

19 Claims. (Cl. 267—21)

This invention relates to vehicles, and is illustrated as embodied in a vehicle having individually sprung wheels. An object of the invention is to improve the mounting of the axle sections or the like of the spring suspension of such a vehicle, partly to add to its controllability and partly to increase its safety in operation.

To this end, the axle section is provided with means, such as a transverse pivot, on which it is mounted and which fixes its axis of movement and which also positively prevents it from accidental displacement lengthwise in case of a heavy side thrust on the wheel. In one embodiment yielding means, such as a rubber bushing, is interposed between the pivot and the axle section mounted thereon. This has certain advantages, but I prefer in most cases to mount the axle sections on their pivots by positive means, preferably in the form of anti-friction bearings such as "needle bearings".

In the illustrated arrangement, the axle section extends at its inner end into a socket, in which is arranged rubber or other yielding non-metallic material externally embracing the end of the axle section and resiliently resisting its angular movement. Preferably the socket has a detachable cap, which may be arranged to hold the pivot in place. The pivot may be flattened at its ends, or otherwise formed, to provide means holding it against turning.

Another feature of the invention relates to the form of rubber or other non-metallic mounting for the axle sections, which includes several blocks preferably of cylindrical form arranged to be distorted crosswise. Three blocks are shown for the base of each section, and these embody substantial novelty in their form and arrangement.

The above and other objects and features of the invention, including various novel combinations of parts and desirable particular constructions, will be apparent from the following description of the illustrative embodiment shown in the accompanying drawings, in which:

Figure 1 is a front elevation of one automobile embodying my invention;

Figure 2 is a partial section on the line 2—2 of Fig. 1, and showing one of the above described transverse pins in side elevation;

Figure 3 is a partial section on the line 3—3 of Figure 2, lengthwise through the end of the arm;

Figure 4 is a partial section on the line 4—4 of Figure 2, through one end of the pin;

Figure 5 is a top plan view of the front end of a car embodying a second modification of the invention;

Figure 6 is a partial section on the line 6—6 of Figure 5, showing the arrangement of the axle sections;

Figure 7 is a view the same as part of Figure 6 but on a larger scale;

Figure 8 is a section through a modified form of rubber block;

Figure 9 is a similar section through another modified form of rubber block; and Figure 10 is a similar section through still another form of rubber block.

The chassis shown in Figure 1, except as pointed out below, may be substantially the same as described and claimed in my application No. 651,821, filed January 14, 1933.

It may include a suitable chassis having a transverse vertical dash structure 10 pivotally supporting the rear end of a power plant 12 which preferably includes in one rigid unit an engine, a clutch, a transmission driven by the engine through the clutch, and a differential driven by the engine through the clutch at high speed and by the transmission at other speeds and in reverse, all substantially as described in the above-identified application.

The front end of the power plant is pivotally supported by a bearing 14 carried by a suitable supporting framework 16 carried by the dash, as described in said application, or by arms as described in my applications Nos. 677,610 and 718,929 filed respectively June 26, 1933 and March 23, 1934. The engine drives, through the differential, the road wheels 18 rotatably mounted, and swiveled for steering movement, at the outer ends of axle sections which (as explained in said application No. 651,821) may include straight upper sections 20 and lower Y-shaped sections 22 having diverging arms secured to the power plant and (at the rear) to the chassis at points spaced apart lengthwise of the chassis, to give stability against side-sway and the like. These axle sections or arms may be made by welding together face to face channel-section steel stampings.

The present invention has to do with the improvement of the movable resilient attachment of the ends of the axle sections 20 and 22 or their equivalents. The ends of these sections are seated in sockets formed in the power plant unit (or in a suitable bracket, at the rear), in which they are secured by caps or the equivalent 24 detachably secured in place by means such as machine screws or bolts 26.

As explained in said application No. 651,821, the arms may be formed on their upper and lower faces with seats for blocks 28 and 30 of resilient material such as rubber, and the end of the axle section may have a seat for a block 32 of similar material yieldingly taking end thrusts. If preferred, a single formed sleeve of rubber may be substituted for these blocks, as described in my application No. 679,473, filed July 8, 1933.

According to an important feature of the invention, the caps 24 and the corresponding sockets or seats are formed with notches or otherwise to embrace and hold the ends of transverse pins or pivots 34, shown made as sections of a tube cut to the desired length and machined off to give flat surfaces 36 which hold the pins against turning.

On the pins 34, within the sockets, in this embodiment are arranged sleeves or bushings 38 of resilient material such as rubber, pressed on the pins and pressed into transverse sleeves or seats 40 welded in the ends of the corresponding arms 20 or 22. The rubber bushings 38 may, if desired, be vulcanized or otherwise bonded to the pins 34 and the sleeves 40, although as torsion strains on and vertical oscillations of the axle sections 20 and 22 are resisted by the blocks 28 and 30 or their equivalent, it is sufficient in most cases for the purposes of the present invention to press the bushings 38 onto the pins 34 and into the sleeves 40.

In the embodiment of Figures 5 to 10, the axle sections 120 and 122, corresponding to sections 20 and 22 respectively, are provided at their inner ends with parts 142 welded or otherwise secured thereto, and at their outer ends have welded thereto eyes 144. Parts 142 are mounted on antifriction bearings such as needle bearings 146 carried by pivots 134 the ends of which are held by the caps 124 in the manner described for pivots 34, being held from turning by flat surfaces 136. Eyes 144 are mounted on the wheel knuckle by similar needle bearings 148 or the equivalent.

The parts 142 are shown each formed with three partially-cylindrical sockets 154 arranged respectively on the top, the end, and the bottom face. Each of these cooperates with a corresponding partially-cylindrical socket in the cap 124 or in the engine casing 12, to enclose a block 150 of rubber or other yielding material, illustrated as being substantially cylindrical.

In Figure 7 the blocks 150 are shown solid. In Figure 8, a corresponding block 250 is shown with an axial opening 252 to give a cushion effect. In Figure 9 another form of such a block 350 is shown reinforced with a tubular center 352, which may be of metal or of harder rubber. In Figure 10, a block 450 of one kind of rubber has a core 452 of another hardness of rubber. I prefer to make the core 452 of softer rubber than the block 450, but there are some advantages in a reverse arrangement.

If desired, the blocks for the lower section 124 may be of softer rubber than those for the upper section 120, since there are twice as many of them.

Whichever type block is used, the angular movements of axle sections 120 and 122 about pivots 134 are yieldingly resisted by the transverse distortion of all of the blocks, the rubber being forced to "flow" directly across the thickest part of the blocks, in shear instead of in compression as in the first embodiment.

While two illustrative embodiments have been described in detail, it is not my intention to limit the scope of the invention to those particular embodiments, or otherwise than by the terms of the appended claims.

I claim:
1. A spring suspension comprising an axle section having a road wheel mounted on one end thereof and having yielding means externally embracing its other end on several sides and resiliently resisting its angular movements and having a transverse pivot located centrally of said yielding means at said other end on which it is mounted.

2. A spring suspension comprising an axle section having yielding means externally embracing its end on several sides and resiliently resisting its angular movements and having a transverse pivot located centrally of said yielding means at said end and on which it is mounted, and with yielding means interposed between said pivot and said end of the axle section.

3. A spring suspension comprising an axle section having yielding means externally embracing its end on several sides and resiliently resisting its angular movements and having a transverse pivot located centrally of said yielding means at said end and on which it is mounted, and with yielding bushing sleeved on said pivot and on which said end of the axle section is mounted.

4. A spring suspension comprising a member having a socket including a removable cap, an axle section extending into the socket, and a pivot for said section secured in place by said cap.

5. A spring suspension comprising sockets carried by the vehicle chassis and having non-metallic yielding blocks mounted therein, and axle sections extending laterally of the vehicle and having road wheels mounted at their outer ends and their inner ends projecting into the sockets and formed with parts distorting the blocks crosswise in shear.

6. A spring suspension comprising sockets formed with transverse partially cylindrical recesses and having non-metallic generally cylindrical yielding blocks mounted in said recesses, and axle sections extending into the sockets and formed with transverse partially cylindrical recesses cooperating with the recesses in the sockets to inclose said blocks, whereby angular movement of the axle sections is resisted by said blocks in shear in an axial plane.

7. Spring suspension means comprising a cylindrical rubber block having its center and its exterior portion of different degrees of resilience, a chassis supported device having a recess formed therein and a wheel supported device movable relatively to said first-named device and having a cooperating recess formed therein, said block fitting in said recesses, and said devices being so constructed and arranged that said block is stressed in shear upon relative movement thereof.

8. A spring suspension comprising sockets carried by the vehicle chassis and having non-metallic yielding blocks mounted therein, axle sections extending laterally of the vehicle and having road wheels mounted at their outer ends and their inner ends projecting into the sockets and formed with parts distorting the blocks crosswise in shear, and a transverse pivot upon which each section is mounted and upon which it rocks against the yielding resistance of said blocks.

9. A spring suspension comprising sockets formed with transverse partially cylindrical recesses and having non-metallic generally cylindrical yielding blocks mounted in said recesses, axle sections extending into the sockets and formed with transverse partially cylindrical recesses cooperating with the recesses in the sockets to inclose said blocks, whereby angular movement of the axle sections is resisted by said blocks in shear in an axial plane, and a transverse pivot upon which each section is mounted and upon which it rocks against the yielding resistance of said blocks.

10. A spring suspension comprising sockets having non-metallic yielding blocks mounted therein, axle sections extending into the sockets and formed with parts distorting the blocks crosswise in shear, and a transverse pivot upon which each section is mounted and upon which it rocks against the yielding resistance of said blocks, each of said sockets being in two separable parts formed to hold the ends of the corresponding pivot between them.

11. A spring suspension comprising sockets formed with partially cylindrical recesses and having non-metallic generally cylindrical yielding blocks mounted in said recesses, axle sections extending into the sockets and formed with partially cylindrical recesses cooperating with the recesses in the sockets to inclose said blocks, whereby angular movement of the axle sections is resisted by said blocks in shear, and a transverse pivot upon which each section is mounted and upon which it rocks against the yielding resistance of said blocks, each of said sockets being in two separable parts formed to hold the ends of the corresponding pivot between them.

12. A spring suspension comprising sockets having non-metallic yielding blocks mounted therein, axle sections extending into the sockets and formed with parts distorting the blocks crosswise in shear, and a transverse pivot upon which each section is mounted and upon which it rocks against the yielding resistance of said blocks, each of said sockets being in two separable parts formed to hold the ends of the corresponding pivot between them, the ends of the pivots being formed in such a manner as to hold them against turning.

13. A spring suspension comprising sockets formed with partially cylindrical recesses and having non-metallic generally cylindrical yielding blocks mounted in said recesses, axle sections extending into the sockets and formed with partially cylindrical recesses cooperating with the recesses in the sockets to inclose said blocks, whereby angular movement of the axle sections is resisted by said blocks in shear, and a transverse pivot upon which each section is mounted and upon which it rocks against the yielding resistance of said blocks, each of said sockets being in two separable parts formed to hold the ends of the corresponding pivot between them, the ends of the pivots being formed in such a manner as to hold them against turning.

14. A vehicle spring suspension comprising a movable axle section extending laterally of the vehicle and having a road wheel mounted at its outer end, yielding non-metallic material closely embracing the inner end on several sides, a support carried by the vehicle chassis and having arranged thereon longitudinally of the vehicle a pivot located centrally of the non-metallic material and on which said section is mounted adjacent its inner end, the non-metallic material resiliently resisting angular movement of said section upon the pivot.

15. A vehicle spring suspension comprising a movable axle section extending longitudinally of the vehicle and having a road wheel mounted at its outer end, a support carried by the vehicle chassis and having a socket into which the inner end of said section extends, yielding non-metallic material in said socket closely embracing the inner end of the axle section on several sides, a pivot located centrally of the non-metallic material transversely of the socket and paralleling the vehicle axis and on which said section is mounted, the non-metallic material resiliently resisting angular movement of said section upon the pivot.

16. A vehicle spring suspension comprising a movable axle section, yielding non-metallic material externally embracing the end of said section on several sides, a pivot located centrally of said non-metallic material and on which the axle section is mounted, a bushing of yielding non-metallic material interposed between said pivot and the section mounted thereon, the yielding non-metallic material resiliently resisting angular movement of said section upon the pivot.

17. A vehicle spring suspension comprising a movable axle section, a support having a socket into which the end of said section extends, yielding non-metallic material in said socket externally embracing the end of said section on several sides, a pivot transversely of the socket located centrally of said non-metallic material and on which said section is mounted, a bushing of yielding non-metallic material interposed between said pivot and the section mounted thereon, the non-metallic material resiliently resisting angular movement of said section upon the pivot.

18. A vehicle spring suspension comprising a movable axle section extending laterally of the vehicle and having a road wheel mounted at its outer end, yielding non-metallic material closely embracing the inner end of said section on several sides, a support carried by the vehicle chassis and having arranged thereon longitudinally of the vehicle a pivot located centrally of the non-metallic material and on which said section is mounted, means holding said pivot against turning, the non-metallic material resiliently resisting angular movement of said section on the pivot.

19. A vehicle spring suspension comprising a movable axle section, yielding non-metallic material externally embracing the end of said section on several sides, a pivot located centrally of said material and on which the section is mounted, means holding said pivot against turning, a bushing of yielding non-metallic material interposed between said pivot and the section mounted thereon, the non-metallic material resiliently resisting angular movement of said section upon the pivot.

VICTOR W. KLIESRATH.